US012680363B2

(12) United States Patent
Park

(10) Patent No.: US 12,680,363 B2
(45) Date of Patent: Jul. 14, 2026

(54) DRIVING APPARATUS FOR SWING DOOR

(71) Applicants: Hyundai Motor Company, Seoul (KR); Kia Corporation, Seoul (KR)

(72) Inventor: Seung Young Park, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 499 days.

(21) Appl. No.: 18/325,685

(22) Filed: May 30, 2023

(65) Prior Publication Data

US 2024/0140177 A1 May 2, 2024

(30) Foreign Application Priority Data

Oct. 27, 2022 (KR) ........................ 10-2022-0140568

(51) Int. Cl.

*E05F 15/54* (2015.01)
*E05D 15/28* (2006.01)
*E05F 15/53* (2015.01)
*E05F 15/611* (2015.01)

(52) U.S. Cl.

CPC .............. *E05F 15/54* (2015.01); *E05D 15/28* (2013.01); *E05F 15/611* (2015.01); *E05F 15/53* (2015.01); *E05Y 2201/696* (2013.01); *E05Y 2900/506* (2013.01); *E05Y 2900/531* (2013.01)

(58) Field of Classification Search

CPC ......... E05F 15/54; E05F 15/53; E05F 15/611; F15B 15/068; F15B 15/1447; E05Y 2900/506

See application file for complete search history.

(56) References Cited

U.S. PATENT DOCUMENTS 2,308,057 A * 1/1943 Cooley ................... E05F 15/54 49/334
3,255,806 A * 6/1966 Meyer ................... B63B 19/197 92/33
3,264,949 A * 8/1966 Jacques ................. F15B 15/068 74/99 R
4,196,654 A * 4/1980 Stearns ..................... F01B 3/04 92/33
4,490,941 A * 1/1985 Mamach ................. E05F 15/54 49/110
4,731,886 A * 3/1988 Heinrich ................. E05F 15/54 92/151
4,833,827 A * 5/1989 Bode ....................... E05F 15/54 49/335
4,838,102 A * 6/1989 Bode ..................... F15B 15/068 92/33
5,134,923 A * 8/1992 Wexler ................ F16K 31/1635 74/99 A (Continued)

*Primary Examiner* — Justin B Rephann
(74) *Attorney, Agent, or Firm* — Slater Matsil, LLP

(57) ABSTRACT

An embodiment driving apparatus for a swing door includes a drive shaft that is linearly movable, a drive casing rotatably disposed around the drive shaft, and a conversion mechanism configured to convert a linear movement of the drive shaft into a rotational movement of the drive casing, wherein the conversion mechanism includes a first spiral groove provided in an exterior surface of the drive shaft, a second spiral groove provided in an interior surface of the drive casing, and a plurality of balls interposed between the first spiral groove and the second spiral groove.

20 Claims, 9 Drawing Sheets

(56) References Cited

U.S. PATENT DOCUMENTS

| | | | | | |
|---|---|---|---|---|---|
| 5,180,121 | A * | 1/1993 | Banks | E05F 15/72 | 49/237 |
| 6,141,908 | A * | 11/2000 | Bowen | E05F 15/54 | 49/248 |
| 11,143,275 | B2 * | 10/2021 | Raymond | F16H 49/001 | |
| 12,139,953 | B2 * | 11/2024 | David | F15B 15/1447 | |
| 2008/0307709 | A1 * | 12/2008 | Stull | E05D 15/54 | 49/358 |
| 2010/0319262 | A1 * | 12/2010 | Stull | E05F 15/614 | 49/358 |
| 2015/0184682 | A1 * | 7/2015 | Cooper | F15B 15/1457 | 403/59 |
| 2015/0233396 | A1 * | 8/2015 | Cooper | F15B 15/1447 | 403/119 |
| 2019/0154150 | A1 * | 5/2019 | Janakiraman | F15B 15/1433 | |
| 2022/0356659 | A1 * | 11/2022 | David | E06B 11/02 | |

* cited by examiner

DRIVING APPARATUS FOR SWING DOOR

CROSS-REFERENCE TO RELATED APPLICATIONS

This application claims the benefit of Korean Patent Application No. 10-2022-0140568, filed on Oct. 27, 2022, which application is hereby incorporated herein by reference.

TECHNICAL FIELD

The present disclosure relates to a driving apparatus for a swing door.

BACKGROUND

Various vehicles such as passenger cars and buses may include swing doors configured to swing around a vertical axis. The swing door may rotate along a predetermined movement path by a driving apparatus for a swing door.

The driving apparatus for a swing door according to the related art may include an actuator and a transmission mechanism transmitting power of the actuator to the swing door. The actuator may be any one of a fluid cylinder (a pneumatic cylinder, a hydraulic cylinder, etc.) and an electric motor. The transmission mechanism may include a plurality of transmission components transmitting the power of the actuator to the swing door.

In the related art driving apparatus for a swing door, however, as the dimensional management of each transmission component may not be accurate, wear between the transmission components may become severe and noise may be generated between the transmission components. Accordingly, durability of the driving apparatus may be reduced and operability of the driving apparatus may become poor.

The above information described in this background section is provided to assist in understanding the background of the inventive concept and may include any technical concept which is not considered as the prior art that is already known to those skilled in the art.

SUMMARY

The present disclosure relates to a driving apparatus for a swing door. Particular embodiments relate to a driving apparatus for a swing door designed to improve durability and prevent operating noise.

Embodiments of the present disclosure can solve problems occurring in the prior art while advantages achieved by the prior art are maintained intact.

An embodiment of the present disclosure provides a driving apparatus for a swing door designed to prevent wear and noise when power of a linear actuator is transmitted to a swing door, thereby improving durability and operability.

According to an embodiment of the present disclosure, a driving apparatus for a swing door may include a drive shaft moving linearly, a drive casing rotatably disposed around the drive shaft, and a conversion mechanism converting a linear movement of the drive shaft into a rotational movement of the drive casing. The conversion mechanism may include a first spiral groove provided in an exterior surface of the drive shaft, a second spiral groove provided in an interior surface of the drive casing, and a plurality of balls interposed between the first spiral groove and the second spiral groove.

The second spiral groove may be recessed from the interior surface of the drive casing by a predetermined depth, and the depth of the second spiral groove may be less than a thickness of the drive casing.

A radius of each ball may be substantially the same as a cross-sectional radius of the first spiral groove and a cross-sectional radius of the second spiral groove.

The driving apparatus may further include a sleeve fixed to an exterior surface of the drive casing. The drive casing may be connected to the swing door through the sleeve.

The driving apparatus may further include a suppressor received in the sleeve and a spring causing the suppressor to be biased downwardly. The suppressor may suppress an upward movement of the drive casing by a biasing force of the spring.

The conversion mechanism may further include a ball retainer disposed between the drive shaft and the drive casing, and the ball retainer may have a plurality of through holes receiving the plurality of balls, respectively.

The drive casing may include an upper stopper and a lower stopper mounted therein, and the upper stopper and the lower stopper may restrict a movement of the ball retainer.

The driving apparatus may further include a linear actuator causing the drive shaft to move linearly.

The linear actuator may include a cylinder tube having a first open end and a second open end opposing each other, a piston movable in the cylinder tube, a first end cover mounted in the first open end of the cylinder tube, and a second end cover mounted in the second open end of the cylinder tube.

The linear actuator may further include an internal rod mounted at the center of the piston. The internal rod may include a first extension portion extending from the piston toward the first end cover and a second extension portion extending from the piston toward the second end cover.

The driving apparatus may further include a lubricating bush and a packing provided between the drive shaft and the linear actuator. The packing may be located below the lubricating bush.

The lubricating bush may include a lubricating groove provided in an interior surface thereof, and the lubricating groove may be open to the exterior surface of the drive shaft.

The lubricating bush may include a brass material.

The packing may include an inner contact portion contacting the exterior surface of the drive shaft, an outer contact portion contacting the linear actuator, and a recessed portion provided between the inner contact portion and the outer contact portion.

The inner contact portion may include a plurality of inner lips having different inner diameters, and the plurality of inner lips may form a step structure.

BRIEF DESCRIPTION OF THE DRAWINGS

The above and other objects, features, and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
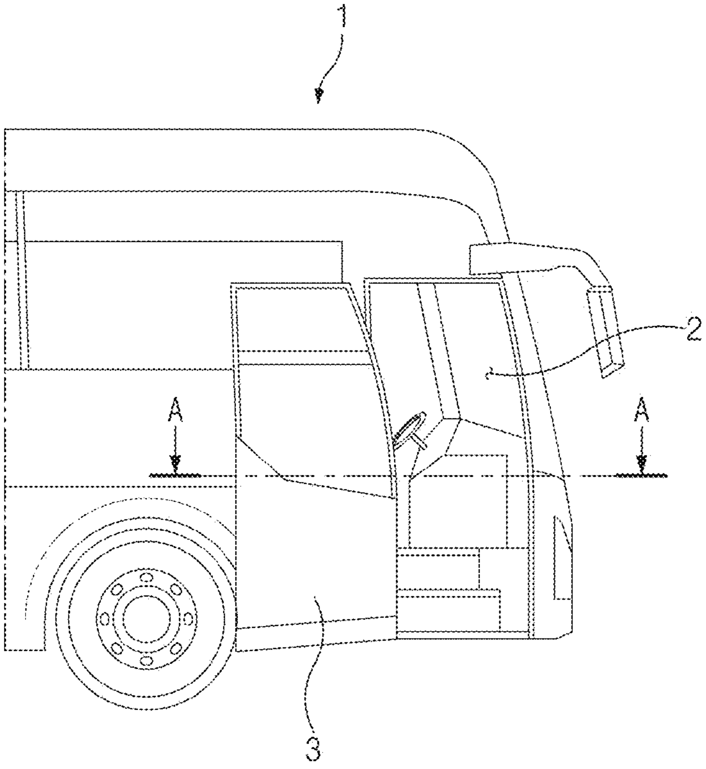
FIG. 1 illustrates a state in which a swing door moves from a door aperture of a vehicle to an open position by a driving apparatus for a swing door according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art and are not to be interpreted as having ideal or excessively formal meanings unless clearly defined as having such in the present application.

Referring to FIG. 1, according to an exemplary embodiment of the present disclosure, a vehicle 1 may include a swing door 3 mounted to swing in a door aperture 2, and the swing door 3 may move between a closed position and an open position. As illustrated in FIG. 1, the vehicle 1 may be a bus, and the swing door 3 may be a bus door. As the swing door 3 moves to the closed position, and the swing door 3 contacts edges of the door aperture 2, the swing door 3 may be lifted upwardly, and the swing door 3 may fully cover the door aperture 2.

Figure 2:
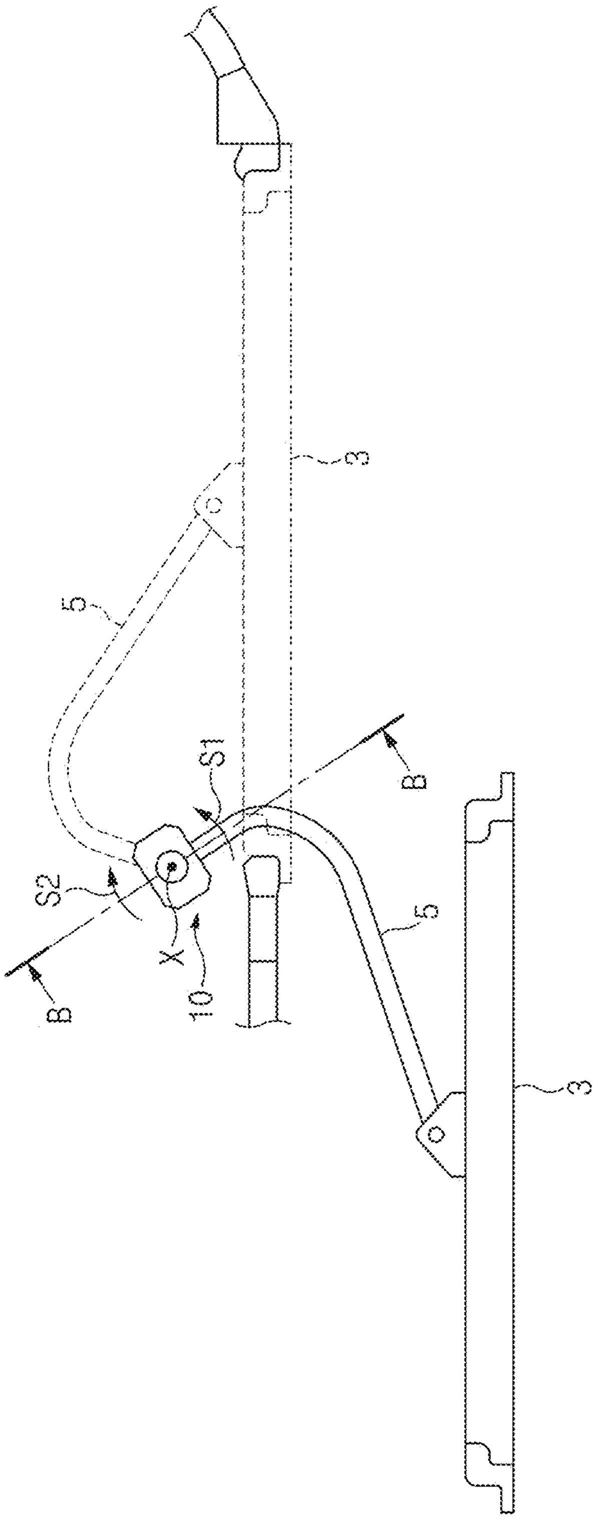
FIG. 2 illustrates a cross-sectional view, taken along line A-A of FIG. 1.

Referring to FIG. 2, the swing door 3 may include a swing arm 5 mounted on an interior surface of the swing door 3 and a driving apparatus 10 driving the swing arm 5. A first end portion of the swing arm 5 may be directly connected to the driving apparatus 10, and a second end portion of the swing arm 5 may be directly connected to the interior surface of the swing door 3.

Figure 3:
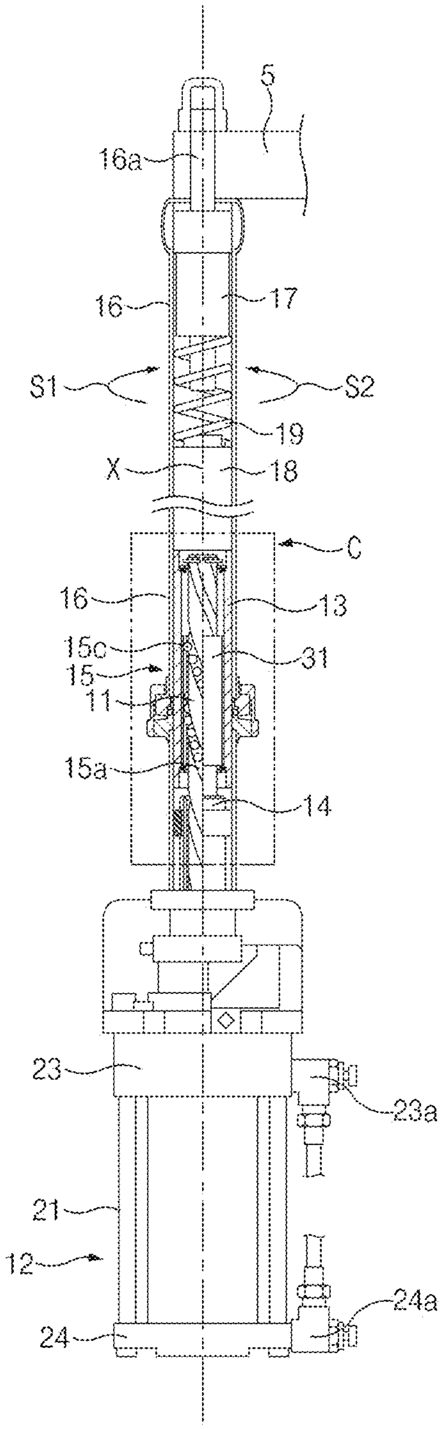
FIG. 3 illustrates a cross-sectional view, taken along line B-B of FIG. 2.

The driving apparatus 10 for a swing door may allow the swing arm 5 to swing around an axis X of the driving apparatus 10. As the swing arm 5 swings by the driving apparatus 10, the swing door 3 may move between the closed position and the open position. Referring to FIG. 3, the driving apparatus 10 may include a drive shaft 11, a linear actuator 12 causing the drive shaft 11 to move linearly, a drive casing 13 rotatably disposed around the drive shaft 11, and a conversion mechanism 15 converting a linear movement of the drive shaft 11 into a rotational movement of the drive casing 13.

The axis X of the driving apparatus 10 may extend vertically, and the drive shaft 11 may extend along the axis X of the driving apparatus 10. The drive shaft 11 may linearly move along the axis X of the driving apparatus 10.

The driving apparatus 10 may further include a guide 14 guiding the movement of the drive shaft 11, and the guide 14 may be connected to the linear actuator 12. As a spline structure is provided between the guide 14 and the drive shaft 11, the guide 14 may accurately guide the linear movement of the drive shaft 11. An axis of the guide 14 may be aligned with the axis X of the driving apparatus 10.

The linear actuator 12 may cause the drive shaft 11 to linearly move along the axis X of the driving apparatus 10.

The drive casing 13 may be rotatably disposed around the drive shaft 11. In particular, the drive casing 13 may rotate around the axis X of the driving apparatus 10. The drive casing 13 may have a cylindrical shape having an inner diameter greater than a diameter of the drive shaft 11.

The driving apparatus 10 may include a sleeve 16 fixed to an exterior surface of the drive casing 13, and the sleeve 16 may be connected to the swing arm 5 through a fixing pin **16*a*. Accordingly, the drive casing 13 may be connected to the swing arm 5 through the sleeve 16. As the drive casing 13 rotates, the sleeve 16 and the swing arm 5** may swing together.

The driving apparatus 10 may include a support 17, a suppressor 18, and a spring 19 which are received in the sleeve 16. The support 17 may be fixedly disposed in an upper portion of the sleeve 16, and the fixing pin **16*a* may be mounted on the support 17. The suppressor 18 may be movably disposed below the support 17, and the spring 19 may be interposed between the support 17 and the suppressor 18. A top end of the spring 19 may contact the support 17, and a bottom end of the spring 19 may contact the suppressor 18. That is, the spring 19 may cause the suppressor 18 to be biased downwardly by a biasing force thereof. As the spring 19 applies the biasing force to the suppressor 18, the suppressor 18 may suppress an upward movement of the drive casing 13 and an upward movement of the drive shaft 11. A top surface of the drive casing 13 may contact a bottom surface of the suppressor 18**.

The conversion mechanism 15 may include a first spiral groove **15*a* provided in an exterior surface of the drive shaft 11, a second spiral groove 15*b* provided in an interior surface of the drive casing 13, and a plurality of balls 15*c* interposed between the first spiral groove 15*a* and the second spiral groove 15*b***.

Figure 4:
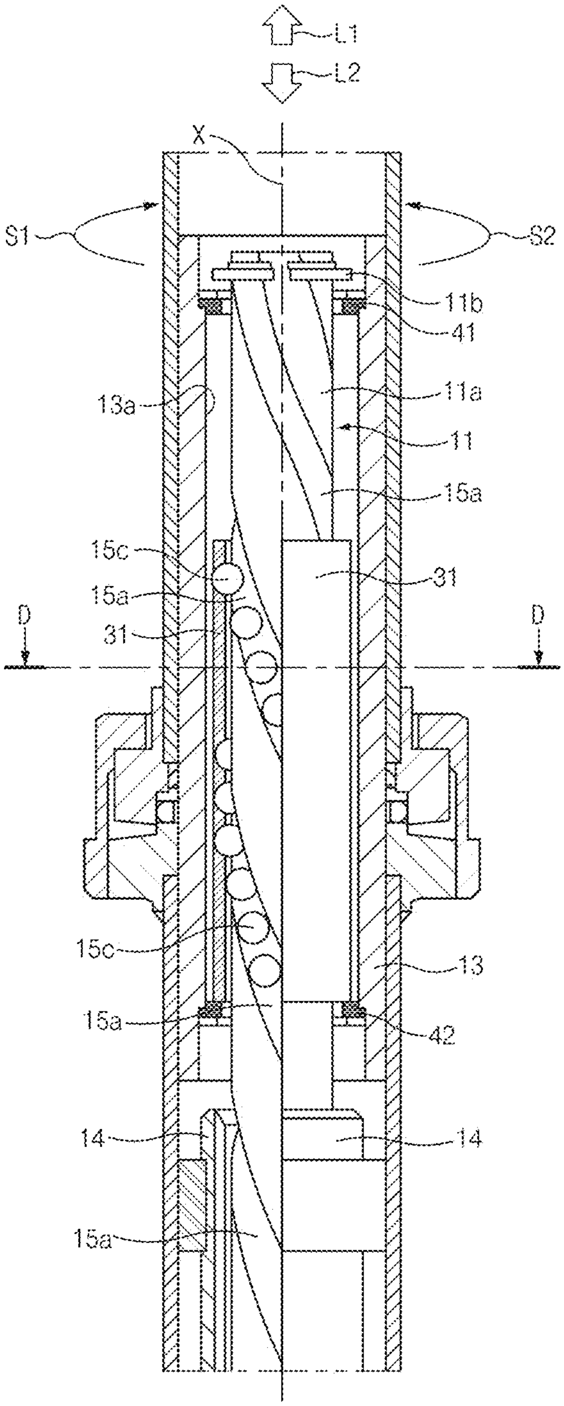
FIG. 4 illustrates an enlarged view of portion C of FIG. 3.
Figure 6:
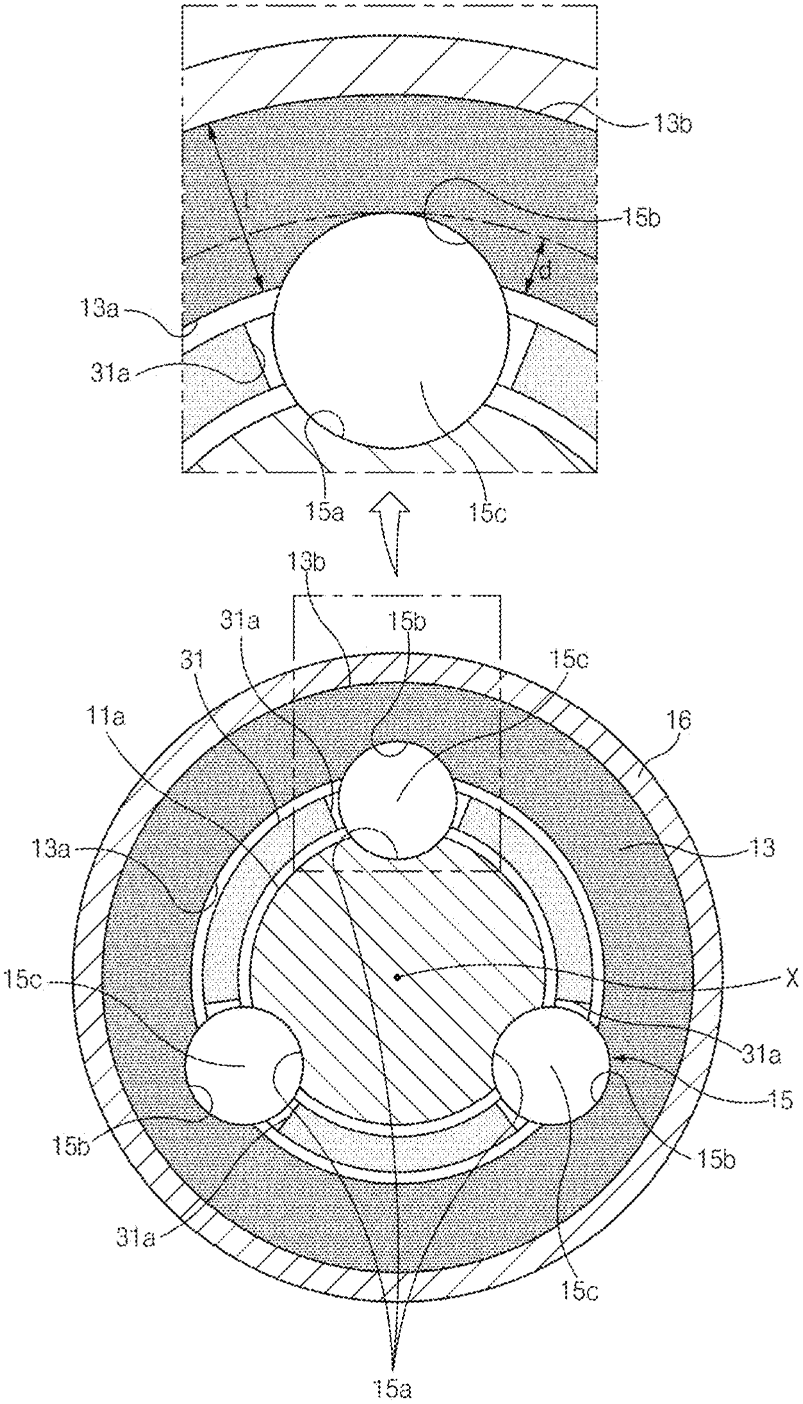
FIG. 6 illustrates a cross-sectional view, taken along line D-D of FIG. 4.

The first spiral groove **15*a* may be a single-start spiral groove or a multi-start spiral groove. Referring to FIGS. 4 and 6, the plurality of first spiral grooves 15*a* parallel to each other may be provided in the exterior surface 11*a* of the drive shaft 11. Each first spiral groove 15*a* may extend along a predetermined spiral path in the exterior surface 11*a* of the drive shaft 11**.

Figure 5:
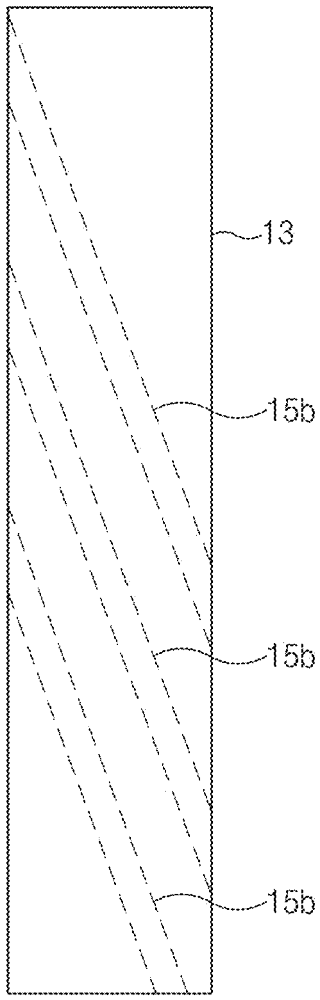
FIG. 5 illustrates a side view of a drive casing illustrated in FIG. 3.

The second spiral groove **15*b* may be a single-start spiral groove or a multi-start spiral groove. Referring to FIGS. 5 and 6, the plurality of second spiral grooves 15*b* parallel to each other may be provided in the interior surface 13*a* of the drive casing 13. Each second spiral groove 15*b* may extend along a predetermined spiral path in the interior surface 13*a* of the drive casing 13**.

Referring to FIG. 6, the exterior surface **11*a* of the drive shaft 11 may face the interior surface 13*a* of the drive casing 13. The first spiral groove 15*a* may face the corresponding second spiral groove 15*b*, and the first spiral groove 15*a* may be parallel to the corresponding second spiral groove 15*b***.

As the plurality of balls 15c are interposed between the first spiral groove 15a and the corresponding second spiral groove 15b, the plurality of balls 15c may be arranged in a spiral shape.

Each ball 15c may be made of a material having enough stiffness and strength such as steel. Accordingly, the ball 15c may smoothly transmit an axial force of the drive shaft 11 to the drive casing 13.

Referring to FIG. 6, a radius of each ball 15c may be substantially the same as a cross-sectional radius of the first spiral groove 15a and a cross-sectional radius of the second spiral groove 15b, and accordingly a full surface contact between one-side exterior surface of the ball 15c and the first spiral groove 15a and a full surface contact between the other-side exterior surface of the ball 15c and the second spiral groove 15b may be made uniformly. Each ball 15c may be received between the first spiral groove 15a and the second spiral groove 15b facing each other, and the ball 15c may uniformly contact the first spiral groove 15a and the second spiral groove 15b. That is, a contact area between the ball 15c and the first spiral groove 15a may be similar to or be the same as a contact area between the ball 15c and the second spiral groove 15b. A portion of the ball 15c may be in rolling contact with the first spiral groove 15a, and the rest of the ball 15c may be in rolling contact with the second spiral groove 15b.

For ease of manufacturing, in a case in which the second spiral groove 15b is cut in a radial direction of the drive casing 13 and the second spiral groove 15b is open to the interior surface and exterior surface of the drive casing 13, the second spiral groove 15b may be machined and then subjected to heat treatment, and accordingly the drive casing 13 may be deformed due to the heat treatment. Due to dimensional non-uniformity, the contact between the ball 15c and the first spiral groove 15a and the contact between the ball 15c and the second spiral groove 15b may not be kept accurately, and noise may be severely generated between the first spiral groove 15a, the ball 15c, and the second spiral groove 15b during the operation of the driving apparatus 10. In particular, the contact area between the ball 15c and the second spiral groove 15b may not be sufficient, which may lead to friction between the ball 15c and the first spiral groove 15a in a biased manner. Accordingly, the ball 15c may fail to smoothly transmit the axial force or axial load of the drive shaft 11 to the drive casing 13 through the first spiral groove 15a and the second spiral groove 15b so that the operability of the driving apparatus 10 may be reduced.

According to a preferable embodiment of the present disclosure, as illustrated in FIGS. 5 and 6, the second spiral groove 15b may be recessed from the interior surface 13a of the drive casing 13 by a predetermined depth d. As the depth d of the second spiral groove 15b is less than a thickness t of the drive casing 13, the exterior surface 13b of the drive casing 13 may not be open, and the entirety of the exterior surface 13b of the drive casing 13 may remain as a closed surface. As the second spiral groove 15b is formed to have the depth d less than the thickness t of the drive casing 13 in the interior surface 13a of the drive casing 13, deformation thereof may be minimized during the heat treatment of the drive casing 13. As the second spiral groove 15b has a predetermined cross-sectional radius in the interior surface 13a of the drive casing 13, the surface contact between the ball 15c and the second spiral groove 15b and the surface contact between the ball 15c and the first spiral groove 15a may be sufficiently made, thereby preventing noise between the first spiral groove 15a, the ball 15c, and the second spiral groove 15b. The ball 15c may smoothly transmit the axial force of the drive shaft 11 to the drive casing 13 through the first spiral groove 15a and the second spiral groove 15b so that the operability of the driving apparatus 10 may be improved.

Referring to FIG. 6, the conversion mechanism 15 may further include a ball retainer 31 disposed between the drive shaft 11 and the drive casing 13, and the ball retainer 31 may have a cylindrical shape surrounding the drive shaft 11. The ball retainer 31 may be configured to retain the position of each ball 15c. The ball retainer 31 may include a plurality of through holes 31a receiving the plurality of balls 15c, respectively. A diameter of each through hole 31a may be slightly greater than that of the ball 15c. The plurality of through holes 31a may be arranged in a spiral shape in the ball retainer 31 to correspond to the first spiral grooves 15a and the second spiral grooves 15b. For example, when there are three lines of the first spiral grooves 15a and three lines of the second spiral grooves 15b, the plurality of through holes 31a may be arranged in three spiral lines along the first spiral grooves 15a and the second spiral grooves 15b. The positions of the plurality of balls 15c may be stably kept by the ball retainer 31 so that the plurality of balls 15c may be prevented from being separated from the first spiral grooves 15a and the second spiral grooves 15b.

The drive casing 13 may include an upper stopper 41 and a lower stopper 42 mounted therein, and the upper stopper 41 and the lower stopper 42 may be spaced apart from each other by a predetermined distance. A linear movement of the ball retainer 31 may be restricted between the upper stopper 41 and the lower stopper 42. Referring to FIG. 4, the upper stopper 41 may be disposed in an upper portion of the drive casing 13, and the lower stopper 42 may be disposed in a lower portion of the drive casing 13.

When the drive shaft 11 moves linearly along the axis X of the driving apparatus 10 by the linear actuator 12, the linear movement of the drive shaft 11 may be converted into the rotational movement of the drive casing 13 by the conversion mechanism 15.

When the drive shaft 11 moves upwardly by the linear actuator 12 (see direction L1 in FIG. 4), the plurality of balls 15c may transmit the axial force of the drive shaft 11 from the first spiral grooves 15a to the second spiral grooves 15b. The lifting of the drive casing 13 may be suppressed by the weight of the swing door 3 and an elastic force of the spring 19, and the plurality of balls 15c in the first spiral grooves 15a and the second spiral grooves 15b may transmit the axial force of the drive shaft 11 in the upward spiral direction so that the drive casing 13 may rotate in a first rotation direction (see direction S1 in FIG. 4). As the drive casing 13 rotates in the first rotation direction S1, the swing door 3 may move to the closed position (see a dotted line in FIG. 2). As the swing door 3 moves to the closed position, and the swing door 3 contacts the edges of the door aperture 2, the rotation of the drive casing 13 may be restricted, and a lift force of the drive casing 13 may overcome the weight of the swing door 3 and the elastic force of the spring 19. Accordingly, as the drive casing 13 moves upwardly, the sleeve 16 and the swing door 3 connected to the drive casing 13 may be lifted together, and thus the swing door 3 may fully cover the door aperture 2.

When the drive shaft 11 moves downwardly by the linear actuator 12 (see direction L2 in FIG. 4), the plurality of balls 15c may transmit the axial force of the drive shaft 11 from the first spiral grooves 15a to the second spiral grooves 15b. The drive casing 13 may move downwardly due to the addition of the weight of the swing door 3 and the elastic force of the spring 19. After the drive casing 13 moves downwardly, the plurality of balls 15*c* in the first spiral grooves 15*a* and the second spiral grooves 15*b* may transmit the axial force of the drive shaft 11 in the downward spiral direction so that the drive casing 13 may rotate in a second rotation direction (see direction S2 in FIG. 4). As the drive casing 13 rotates in the second rotation direction S2, the swing door 3 may move to the open position (see a solid line in FIG. 2). Thus, the swing door 3 may fully uncover the door aperture 2.

According to an exemplary embodiment, the linear actuator 12 may be a fluid cylinder such as a pneumatic cylinder. As a fluid such as compressed air is supplied to or recovered from the linear actuator 12, the linear actuator 12 may cause the drive shaft 11 to move along the axis X of the driving apparatus 10.

Figure 7:
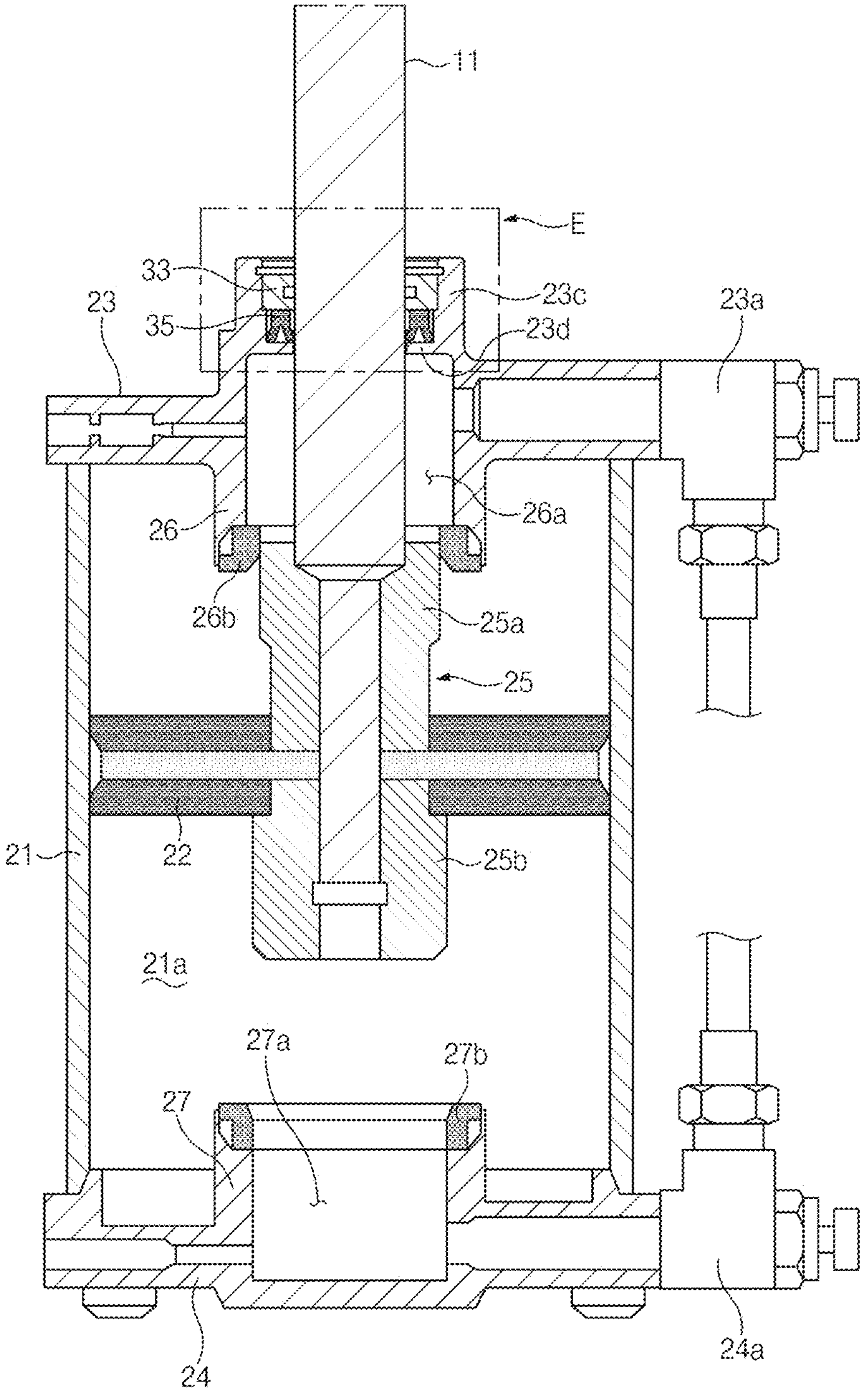
FIG. 7 illustrates a cross-sectional view of a linear actuator illustrated in FIG. 3.

Referring to FIG. 7, the linear actuator 12 may include a cylinder tube 21 having a first open end and a second open end opposing each other, a piston 22 movable in the cylinder tube 21, a first end cover 23 mounted in the first open end of the cylinder tube 21, and a second end cover 24 mounted in the second open end of the cylinder tube 21.

The cylinder tube 21 may have a chamber 21*a* defined therein. The first open end of the cylinder tube 21 may be sealed by the first end cover 23, and the second open end of the cylinder tube 21 may be sealed by the second end cover 24.

An internal rod 25 may be mounted at the center of the piston 22, and the internal rod 25 may include a first extension portion 25*a* extending from the piston 22 toward the first end cover 23 and a second extension portion 25*b* extending from the piston 22 toward the second end cover 24.

A bottom end of the drive shaft 11 may be connected to the first extension portion 25*a*, and the drive shaft 11 may move together with the piston 22 and the internal rod 25 along the axis X of the driving apparatus 10.

The first end cover 23 may have a first rod seat 26 extending toward the internal rod 25. A first port fitting 23*a* may be mounted on the first end cover 23, and a fluid hose may be connected to the first port fitting 23*a*. The first rod seat 26 may have a first cavity 26*a* defined therein, and the chamber 21*a* of the cylinder tube 21 and the first port fitting 23*a* may fluidly communicate with the first cavity 26*a* of the first rod seat 26. When the piston 22 moves upwardly, the first extension portion 25*a* of the internal rod 25 may be received in the first cavity 26*a* of the first rod seat 26. When the piston 22 moves downwardly, the first extension portion 25*a* of the internal rod 25 may be out of the first cavity 26*a* of the first rod seat 26. A first sealing member 26*b* may be mounted in a bottom opening of the first rod seat 26, and the first sealing member 26*b* may provide sealing between the first extension portion 25*a* of the internal rod 25 and the first rod seat 26. As the fluid (the compressed air) is supplied to the first cavity 26*a* of the first rod seat 26 and the chamber 21*a* of the cylinder tube 21 through the first port fitting 23*a*, the piston 22 may move downwardly, and accordingly the drive shaft 11 may move downwardly.

The second end cover 24 may have a second rod seat 27 extending toward the internal rod 25. A second port fitting 24*a* may be mounted on the second end cover 24, and the fluid hose may be connected to the second port fitting 24*a*. The second rod seat 27 may have a second cavity 27*a* defined therein, and the chamber 21*a* of the cylinder tube 21 and the second port fitting 24*a* may fluidly communicate with the second cavity 27*a* of the second rod seat 27. When the piston 22 moves upwardly, the second extension portion 25*b* of the internal rod 25 may be out of the second cavity 27*a* of the second rod seat 27. When the piston 22 moves downwardly, the second extension portion 25*b* of the internal rod 25 may be received in the second cavity 27*a* of the second rod seat 27. A second sealing member 27*b* may be mounted in a top opening of the second rod seat 27, and the second sealing member 27*b* may provide sealing between the second extension portion 25*b* of the internal rod 25 and the second rod seat 27. As the fluid (the compressed air) is supplied to the second cavity 27*a* of the second rod seat 27 and the chamber 21*a* of the cylinder tube 21 through the second port fitting 24*a*, the piston 22 may move upwardly, and accordingly the drive shaft 11 may move upwardly.

Figure 8:
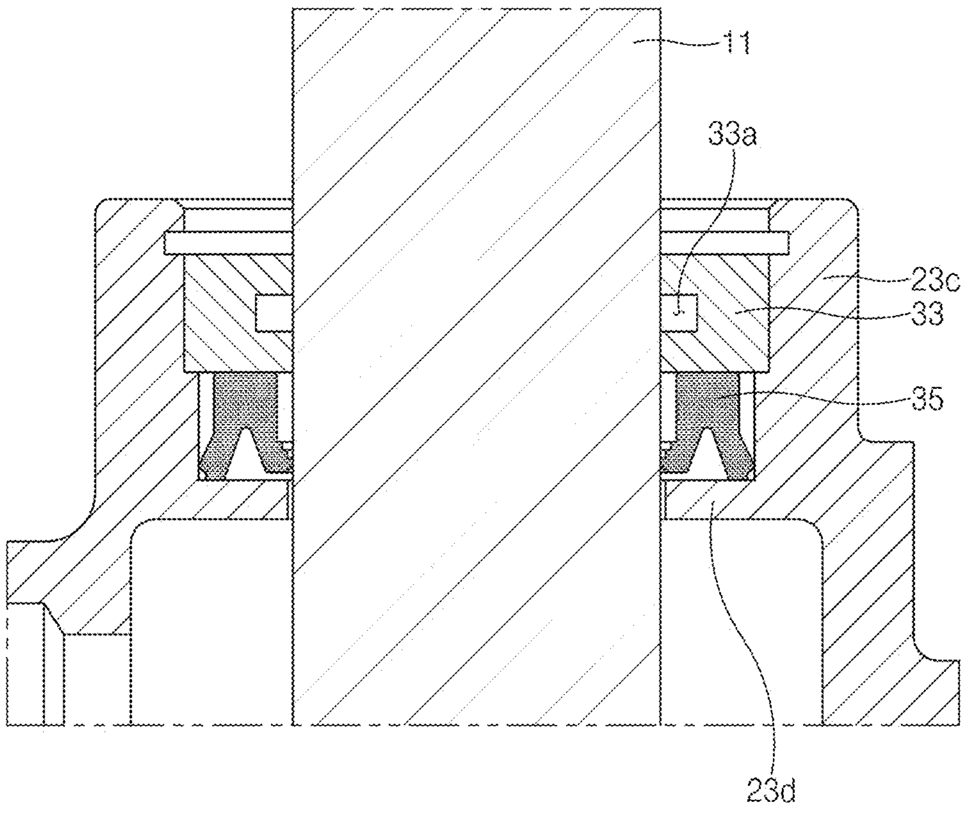
FIG. 8 illustrates an enlarged view of portion E of FIG. 7.

Referring to FIGS. 7 and 8, the driving apparatus 10 according to an exemplary embodiment of the present disclosure may include a lubricating bush 33 provided between the drive shaft 11 and the first end cover 23 of the linear actuator 12, and the lubricating bush 33 may have an annular shape surrounding the drive shaft 11. The first end cover 23 may have a mounting boss 23*c* extending upwardly from the first end cover 23, and the lubricating bush 33 may be mounted in the mounting boss 23*c*. The lubricating bush 33 may provide lubrication between the drive shaft 11 and the first end cover 23 of the linear actuator 12 when the drive shaft 11 moves along the axis X of the driving apparatus 10. The lubricating bush 33 may be made of a brass material in which relatively little dimensional changes occur due to temperature changes. As the lubricating bush 33 is made of the brass material, its dimensional accuracy may be improved. In addition, wear resistance of the lubricating bush 33 may be satisfactory, and impact resistance and durability of the lubricating bush 33 may be improved. Referring to FIG. 8, the lubricating bush 33 may include a lubricating groove 33*a* defined in an interior surface thereof, and the lubricating groove 33*a* may be open to the exterior surface of the drive shaft 11. The lubricating groove 33*a* may be filled with lubricating oil such as grease. Accordingly, the lubricating oil may be uniformly provided between the drive shaft 11 and the lubricating bush 33, thereby preventing uneven wear of the drive shaft 11 and the lubricating bush 33.

Referring to FIGS. 7 and 8, the driving apparatus 10 according to an exemplary embodiment of the present disclosure may include a packing 35 located below the lubricating bush 33, and the packing 35 may be made of an elastic material such as rubber. The packing 35 may provide sealing between the drive shaft 11 and the first end cover 23 of the linear actuator 12, and the packing 35 may have an annular shape surrounding the drive shaft 11. The mounting boss 23*c* may have an annular shoulder 23*d*, and the annular shoulder 23*d* may protrude from an interior surface of the mounting boss 23*c* toward the center of the mounting boss 23*c*. A bottom surface of the packing 35 may be supported by a top surface of the shoulder 23*d*.

Figure 9:
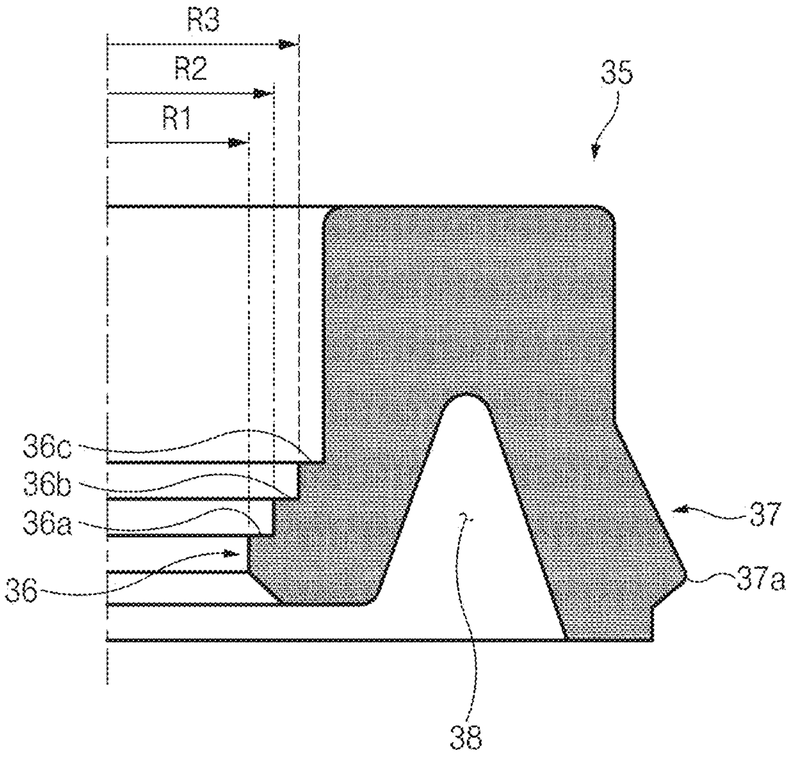
FIG. 9 illustrates an enlarged view of a packing illustrated in FIG. 7.

Referring to FIG. 9, the packing 35 may include an inner contact portion 36 contacting the exterior surface of the drive shaft 11, an outer contact portion 37 contacting the interior surface of the mounting boss 23*c* of the first end cover 23 of the linear actuator 12, and a recessed portion 38 provided between the inner contact portion 36 and the outer contact portion 37.

The inner contact portion 36 may be provided on an interior surface of the packing 35, and the inner contact portion 36 may include a plurality of inner lips 36*a*, 36*b*, and 36*c* having different inner diameters. The plurality of inner lips 36*a*, 36*b*, and 36*c* may be continuously formed on the interior surface of the packing 35 along the axis X of the driving apparatus 10. Even when any one of the plurality of inner lips 36*a*, 36*b*, and 36*c* is damaged, the other inner lips may contact the exterior surface of the drive shaft 11 so that leakage of the fluid (for example, the compressed air) in the linear actuator 12 may be prevented, and a foreign object may be prevented from entering the linear actuator 12.

Referring to FIG. 9, the plurality of inner lips 36*a*, 36*b*, and 36*c* may include a first inner lip 36*a* having a first inner diameter R1, a second inner lip 36*b* having a second inner diameter R2, and a third inner lip 36*c* having a third inner diameter R3. The plurality of inner lips 36*a*, 36*b*, and 36*c* may form a step structure, and accordingly the plurality of inner lips 36*a*, 36*b*, and 36*c* may prevent the lubricating oil such as grease from entering the linear actuator 12. The first inner lip 36*a*, the second inner lip 36*b*, and the third inner lip 36*c* may be continuously formed on the interior surface of the packing 35 along the axis of the driving apparatus 10. The second inner diameter R2 may be greater than the first inner diameter R1, and the third inner diameter R3 may be greater than the second inner diameter R2.

The outer contact portion 37 may be provided on an exterior surface of the packing 35, and the outer contact portion 37 may include an outer lip 37*a*. As the outer lip 37*a* contacts the interior surface of the fixed mounting boss 23*c*, wear or damage of the outer lip 37*a* may be relatively reduced, and accordingly only one outer lip 37*a* may be provided.

As the recessed portion 38 is provided between the inner contact portion 36 and the outer contact portion 37, the inner contact portion 36 and the outer contact portion 37 may be elastically deformed.

As set forth above, according to exemplary embodiments of the present disclosure, the balls may smoothly transmit the axial force of the drive shaft to the drive casing through the first and second spiral grooves so that the swing operation of the swing door may be facilitated. In particular, the balls may uniformly contact the first spiral grooves and the second spiral grooves, which may prevent wear and noise when the swing door is opened and closed.

According to exemplary embodiments of the present disclosure, each ball may uniformly contact the first spiral groove and the second spiral groove so that any one of the first spiral groove and the second spiral groove may be prevented from being unevenly worn. Accordingly, durability of the swing door may be improved.

According to exemplary embodiments of the present disclosure, the lubricating bush may include the lubricating groove filled with the lubricating oil so that the lubricating oil may be uniformly provided between the drive shaft and the lubricating bush. Accordingly, lubrication performance of the drive shaft may be improved, and the friction between the drive shaft and the lubricating bush may be reduced.

According to exemplary embodiments of the present disclosure, the packing for sealing between the drive shaft and the linear actuator may have the stepped inner contact portion, thereby effectively preventing the leakage of the fluid (the compressed air) in the linear actuator.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A driving apparatus for a swing door, the driving apparatus comprising:

a drive shaft that is linearly movable;

a drive casing rotatably disposed around the drive shaft; and a conversion mechanism configured to convert a linear movement of the drive shaft into a rotational movement of the drive casing, wherein the conversion mechanism comprises a first spiral groove provided in an exterior surface of the drive shaft, a second spiral groove provided in an interior surface of the drive casing, and a plurality of balls interposed between the first spiral groove and the second spiral groove;

a sleeve fixed to an exterior surface of the drive casing, wherein the drive casing is connected to the swing door through the sleeve; and a suppressor received in the sleeve and a spring configured to cause the suppressor to be biased downwardly, wherein the suppressor is configured to suppress an upward movement of the drive casing by a biasing force of the spring.

2. The driving apparatus according to claim 1, wherein:

the second spiral groove is recessed from the interior surface of the drive casing by a predetermined depth; and the predetermined depth of the second spiral groove is less than a thickness of the drive casing.

3. The driving apparatus according to claim 1, wherein a radius of each ball is substantially the same as a cross-sectional radius of the first spiral groove and a cross-sectional radius of the second spiral groove.

4. The driving apparatus according to claim 1, wherein:

the conversion mechanism further comprises a ball retainer disposed between the drive shaft and the drive casing; and the ball retainer comprises a plurality of through holes configured to receive the plurality of balls, respectively.

5. The driving apparatus according to claim 4, wherein:

the drive casing comprises an upper stopper and a lower stopper mounted therein; and the upper stopper and the lower stopper are configured to restrict a movement of the ball retainer.

6. The driving apparatus according to claim 1, wherein:

the first spiral groove has a single-start spiral configuration or a multi-start spiral configuration; and the second spiral groove has a single-start spiral configuration or a multi-start spiral configuration.

7. The driving apparatus according to claim 1, wherein:

the drive casing comprises an upper stopper and a lower stopper disposed therein; and the upper stopper is disposed in an upper portion of the drive casing and the lower stopper is disposed in a lower portion of the drive casing.

8. A driving apparatus for a swing door, the driving apparatus comprising:

a drive shaft that is linearly movable;

a linear actuator coupled to the drive shaft to cause the drive shaft to move linearly;

a drive casing rotatably disposed around the drive shaft; and a conversion mechanism configured to convert a linear movement of the drive shaft into a rotational movement of the drive casing, wherein the conversion mechanism comprises a first spiral groove provided in an exterior surface of the drive shaft, a second spiral groove provided in an interior surface of the drive casing, and a plurality of balls interposed between the first spiral groove and the second spiral groove;

a sleeve fixed to an exterior surface of the drive casing, wherein the drive casing is connected to the swing door through the sleeve; and a suppressor received in the sleeve and a spring configured to cause the suppressor to be biased downwardly, wherein the suppressor is configured to suppress an upward movement of the drive casing by a biasing force of the spring.

9. The driving apparatus according to claim 8, wherein the linear actuator comprises:

a cylinder tube having a first open end and a second open end opposing each other;

a piston movable in the cylinder tube;

a first end cover mounted in the first open end of the cylinder tube; and a second end cover mounted in the second open end of the cylinder tube.

10. The driving apparatus according to claim 9, wherein:

the linear actuator further comprises an internal rod mounted at the center of the piston; and the internal rod comprises a first extension portion extending from the piston toward the first end cover and a second extension portion extending from the piston toward the second end cover.

11. The driving apparatus according to claim 8, further comprising a lubricating bush and a packing provided between the drive shaft and the linear actuator, wherein the packing is located below the lubricating bush.

12. The driving apparatus according to claim 11, wherein:

the lubricating bush comprises a lubricating groove provided in an interior surface thereof; and the lubricating groove is open to the exterior surface of the drive shaft.

13. The driving apparatus according to claim 11, wherein the lubricating bush comprises a brass material.

14. The driving apparatus according to claim 11, wherein the packing comprises:

an inner contact portion contacting the exterior surface of the drive shaft;

an outer contact portion contacting the linear actuator; and a recessed portion provided between the inner contact portion and the outer contact portion.

15. The driving apparatus according to claim 14, wherein:

the inner contact portion comprises a plurality of inner lips having different inner diameters; and the plurality of inner lips define a step structure.

16. A vehicle comprising:

a vehicle body;

a swing door coupled to the vehicle body and configured to cover an aperture in the vehicle body;

a swing arm having a first end portion mounted on an interior surface of the swing door;

a driving apparatus, wherein a second end portion of the swing arm is connected to the driving apparatus, and wherein the driving apparatus comprises:

a drive shaft that is linearly movable;

a drive casing rotatably disposed around the drive shaft; and a conversion mechanism configured to convert a linear movement of the drive shaft into a rotational movement of the drive casing, wherein the conversion mechanism comprises a first spiral groove provided in an exterior surface of the drive shaft, a second spiral groove provided in an interior surface of the drive casing, and a plurality of balls interposed between the first spiral groove and the second spiral groove;

a sleeve fixed to an exterior surface of the drive casing, wherein the drive casing is connected to the swing door through the sleeve; and a suppressor received in the sleeve and a spring configured to cause the suppressor to be biased downwardly, wherein the suppressor is configured to suppress an upward movement of the drive casing by a biasing force of the spring.

17. The vehicle according to claim 16, wherein:

the second spiral groove is recessed from the interior surface of the drive casing by a predetermined depth; and the predetermined depth of the second spiral groove is less than a thickness of the drive casing.

18. The vehicle according to claim 16, wherein a radius of each ball is substantially the same as a cross-sectional radius of the first spiral groove and a cross-sectional radius of the second spiral groove.

19. The vehicle according to claim 16, wherein:

the conversion mechanism further comprises a ball retainer disposed between the drive shaft and the drive casing;

the ball retainer comprises a plurality of through holes configured to receive the plurality of balls, respectively;

the drive casing comprises an upper stopper and a lower stopper mounted therein; and the upper stopper and the lower stopper are configured to restrict a movement of the ball retainer.

20. The vehicle according to claim 16, wherein:

the driving apparatus further comprises a linear actuator coupled to the drive shaft to cause the drive shaft to move linearly; and the linear actuator comprises a cylinder tube having a first open end and a second open end opposing each other, and a piston movable in the cylinder tube.

* * * * *